United States Patent
Weß et al.

(10) Patent No.: US 10,682,912 B2
(45) Date of Patent: Jun. 16, 2020

(54) OUTPUT DEVICE OF A MOTOR VEHICLE AND ASSOCIATED OPERATING METHOD

(71) Applicant: VOLKSWAGEN AG, Wolfsburg (DE)

(72) Inventors: Alexander Weß, Wolfsburg (DE); Hendrik Schröder, Sickte (DE)

(73) Assignee: Volkswagen AG (DE)

( * ) Notice: Subject to any disclaimer, the term of this patent is extended or adjusted under 35 U.S.C. 154(b) by 45 days.

(21) Appl. No.: 15/585,899

(22) Filed: May 3, 2017

(65) Prior Publication Data

US 2017/0320391 A1 Nov. 9, 2017

(30) Foreign Application Priority Data

May 4, 2016 (DE) .................. 10 2016 207 790

(51) Int. Cl.
*B60W 40/09* (2012.01)
*B60K 35/00* (2006.01)
(Continued)

(52) U.S. Cl.
CPC .............. *B60K 35/00* (2013.01); *B60L 50/15* (2019.02); *B60L 50/16* (2019.02); *B60L 58/12* (2019.02); *G01F 9/001* (2013.01); *G06T 11/206* (2013.01); *G06T 11/60* (2013.01); *B60K 2370/152* (2019.05); *B60K 2370/174* (2019.05); *B60K 2370/52* (2019.05); *B60L 2250/16* (2013.01);
(Continued)

(58) Field of Classification Search
CPC ... Y02T 10/36; Y02T 90/169; G01C 21/3469; G01C 21/3697; B60W 10/06; B60W 10/08; B60W 20/00; B60W 2550/12; B60W 40/09; B60L 2260/54; F02D 2200/0625; G02B 27/01

See application file for complete search history.

(56) References Cited

U.S. PATENT DOCUMENTS

2002/0062183 A1* 5/2002 Yamaguchi .............. B60K 6/46
701/22
2009/0131215 A1 5/2009 Shamoto
(Continued)

FOREIGN PATENT DOCUMENTS

CN 1579830 A 2/2005
CN 102753414 A 10/2012
(Continued)

*Primary Examiner* — Benyam Haile
(74) *Attorney, Agent, or Firm* — Barnes & Thornburg LLP

(57) ABSTRACT

A method for operating an output apparatus of a motor vehicle performed by the output apparatus and including receiving a first consumption signal that indicates a consumption relating to a first form of energy measured in a first unit of measurement, receiving a second consumption signal that indicates a consumption relating to a second form of energy measured in a second unit of measurement, providing at least one reference element that indicates a respective predetermined standard consumption, displaying the at least one reference element on a display unit, and controlling a position of a consumption display element on the display unit based on the two consumption signals and, as a result, adjusting a relative position of the consumption display element with regard to the at least one reference element.

37 Claims, 8 Drawing Sheets

(51) Int. Cl.
  *G06T 11/20* (2006.01)
  *B60L 58/12* (2019.01)
  *B60L 50/16* (2019.01)
  *B60L 50/15* (2019.01)
  *G01F 9/00* (2006.01)
  *G06T 11/60* (2006.01)

(52) U.S. Cl.
  CPC .......... *Y02T 10/7005* (2013.01); *Y02T 10/705* (2013.01); *Y02T 10/7044* (2013.01); *Y02T 10/7077* (2013.01); *Y02T 10/84* (2013.01)

(56) References Cited

U.S. PATENT DOCUMENTS

| | | |
|---|---|---|
| 2011/0227716 A1 | 9/2011 | Lucas |
| 2015/0298570 A1* | 10/2015 | Hisano ................ B60L 11/1861 701/22 |
| 2015/0340975 A1* | 11/2015 | Yanagi .................... B60K 6/52 318/400.06 |

FOREIGN PATENT DOCUMENTS

| | | | |
|---|---|---|---|
| CN | 104340218 A | 2/2015 | |
| DE | 102008053604 A1 | 4/2010 | |
| DE | 102010016446 A1 | 10/2010 | |
| DE | 102011005609 A1 | 12/2011 | |
| DE | 102011116313 A1 * | 4/2013 | ............. B60K 35/00 |
| DE | 102011116313 A1 | 4/2013 | |
| DE | 102013209160 A1 | 11/2014 | |
| DE | 102015200464 A1 | 7/2015 | |
| DE | 112013005179 T5 | 7/2015 | |
| DE | 102014205252 A1 | 9/2015 | |
| DE | 112013006632 T5 | 10/2015 | |
| DE | 102014006321 A1 | 11/2015 | |
| DE | 102015004792 A1 | 12/2015 | |
| DE | 102014012192 A1 | 2/2016 | |
| EP | 2311683 A1 | 4/2011 | |

* cited by examiner

OUTPUT DEVICE OF A MOTOR VEHICLE AND ASSOCIATED OPERATING METHOD

PRIORITY CLAIM

This patent application claims priority to German Patent Application No. 10 2016 207 790.2, filed 4 May 2016, the disclosure of which is incorporated herein by reference in its entirety.

SUMMARY

Illustrative embodiments relate to a method for operating an output apparatus of a motor vehicle. The output apparatus is used to display what volumes of two different forms of energy the motor vehicle consumes during the driving mode. The forms of energy may be a fuel, on the one hand, and electric power, on the other, for example. Illustrative embodiments also relate to the output apparatus operated by means of the method and also a motor vehicle that has the output apparatus.

BRIEF DESCRIPTION OF THE DRAWINGS

Exemplary embodiments are described below. In this regard.

DETAILED DESCRIPTION

Figure 1:
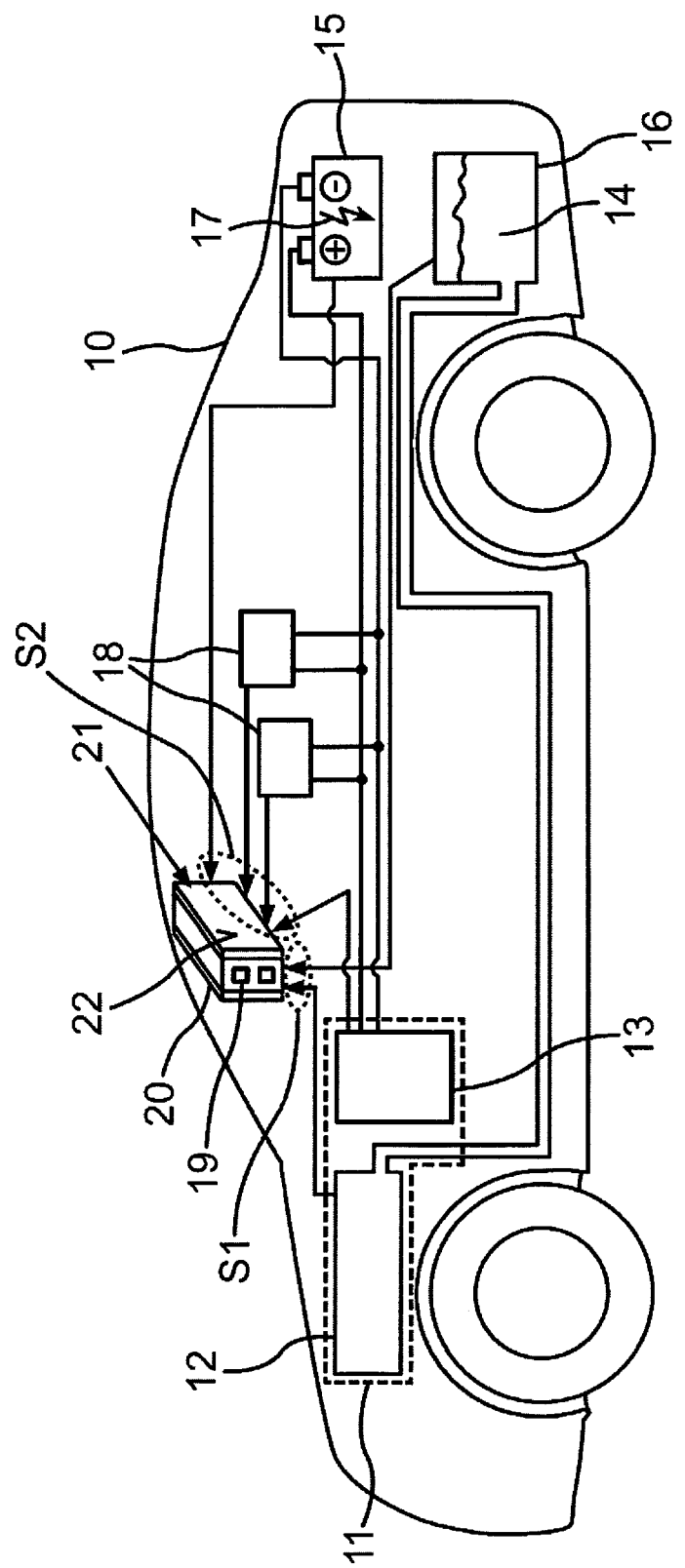
FIG. 1 shows a schematic depiction of an embodiment of the disclosed motor vehicle with an embodiment of the disclosed output apparatus.

In motor vehicles having a hybrid propulsion drive unit, the consumption of the motor vehicle is dependent on two energy sources or forms of energy. In general, these are fuel (gasoline, diesel) and electric power from a battery. The consumption of such a motor vehicle is normally indicated by two numerical values, for example, in $1/100$ km and kWh/100 km. By contrast, the actual consumption is highly dependent on the combination in which the energy source or forms of energy, that is to say fuel and electric power, for example, are used. Therefore, the real consumption frequently differs from a standard driving consumption indicated by the manufacturer of the motor vehicle for the respective vehicle type, for example. The standard driving consumption may be indicated on the basis of the ECE-R101 standard, for example. A driver of the motor vehicle is normally unable to tell why the actual consumption of his vehicle differs from the standard driving consumption with regard to the two forms of energy.

DE 11 2013 005 179 T5 discloses the practice of presenting an energy consumption of the proportional loads on a display device. For propulsion driving, this presents to a driver what proportion of a fuel consumption is caused by air resistance, roll resistance, drive train losses and braking losses. This method provides a breakdown only for the consumption for one form of energy, namely fuel, however.

DE 10 2015 004 792 A1 discloses the practice of visualizing the dependency of the driving range of a hybrid motor vehicle on the electrical consumption of further vehicle components, for example, heating and cooling. If a user of the motor vehicle alters a parameter, then the resultant alteration in the operation of the other vehicle components, particularly the propulsion drive unit, is ascertained and visualized.

DE 11 2013 006 632 D5 discloses a display apparatus that positions an indicator on a display panel to visualize for a user a relationship between vehicle speed and required electrical propulsion drive power.

Disclosed embodiments output or display in a motor vehicle two consumption signals that display the consumption of the motor vehicle with regard to two different forms of energy.

Disclosed embodiments provide a method for operating an output apparatus of a motor vehicle. The output apparatus may, by way of example, be configured as a combined instrument. The method provides for the following operations performed by the output apparatus. The output apparatus receives the first consumption signal, which indicates a consumption relating to a first form of energy. The consumption is measured in a first unit of measurement. The first form of energy may, by way of example, be a fuel, for example, gasoline or diesel, or a resource for a fuel cell. The first unit of measurement can, by way of example, indicate the consumption in a manner related to distance or in a manner related to time or absolutely. A unit of measurement related to distance may, by way of example, be the indication: $1/100$ km. A unit of measurement related to time may, by way of example, be the indication of the consumption since a predetermined time, for example, since the start of the journey. The output apparatus furthermore receives the second consumption signal, which indicates a consumption relating to a second form of energy. The consumption of the second form of energy is measured in a second unit of measurement. The second form of energy may, for example, be electric power. In this case too, there may again be provision for a distance-related or time-related or absolute unit of measurement. In the case of the electric power, the distance-related second unit of measurement may be kW/100 km, for example. The two consumption signals can each indicate a total consumption value for the form of energy, for example, and/or may each also be a combined or multichannel signal that indicates the consumption of the respective form of energy for different loads. The consumption can therefore indicate an average consumption relating to distance or time or perhaps an absolute consumption. In this case, the consumption signals contain a total consumption value and/or multiple consumption values for different vehicle components.

The method involves at least one reference element that indicates a respective predetermined standard consumption being provided on a display unit. The at least one reference element is displayed on the display unit. The display unit may be a screen, for example. Furthermore, a consumption display element is displayed. The consumption display element represents a measurement point that signals or represents the measured consumption. In this case, the position of the consumption display element on the display unit is controlled on the basis of the two consumption signals. By controlling the position, a position of the consumption display element on the display unit is adjusted. The consumption display element is therefore positioned by the present consumption values of the consumption signals. The (resultant) relative position with regard to the at least one reference element allows the particular (present) consumption value to be compared in relation to the "standard consumption". The reference element therefore represents, on the display unit, those possible positions of the consumption display element that arise if the consumption of the motor vehicle with regard to the two forms of energy corresponds to the standard consumption. The standard consumption may be, e.g., a standard driving consumption and/or a standard total consumption. The standard total consumption generally corresponds to the standard driving consumption, since, e.g., no air conditioning system is activated in the licensing process.

Disclosed embodiments provide that the output apparatus combines multiple consumption signals and presents them as the position of a single measurement point or consumption display element. This means that consumption signals for the consumption of different forms of energy can be processed by the output apparatus and signaled or output in a consistent manner by setting the position of the consumption display element. Hence, no interpretation of the results by the user is necessary to relate, by way of example, a comparison between a consumption in liters, on the one hand, and a consumption in kilowatt hours, on the other.

Disclosed embodiments also include optional developments, the features of which result in additional benefits.

There may be provision for a standardized representation of the combined consumption as a time profile. To this end, at least one of the consumption signals (e.g., in the unit of measurement $1/100$ km) is converted, so that the two consumption signals indicate their respective consumption in the same unit of measurement (e.g., kWh/100 km). The two consumption signals are combined to form a total consumption signal. In this case, the at least one reference element forms a respective time axis on the display unit, wherein the consumption display element is moved along a direction of extent of the time axis over time and, in the process, a respective distance of the consumption display element from the time axis is adjusted such that it corresponds to a difference between the total consumption signal and the standard consumption indicated by the reference element. A timing diagram is thus obtained that represents the development or the course of the difference between the total consumption of the motor vehicle and the envisaged standard consumption. This results in a clear graphical representation without technical background knowledge being necessary for interpretation.

Optionally, however, there is provision for the two consumption signals to be output separately from one another. To this end, the display unit has a display panel for which a first direction of extent, for example, the horizontal direction or X direction, is scaled by means of a consumption scale for the first form of energy (for example, $1/100$ km) and a second direction of extent, for example, the vertical direction or Y direction, is scaled by means of a consumption scale for the second form of energy (for example, kWh/100 km). Optionally, there is provision for the two directions of extent described to be at right angles to one another. The at least one reference element is presented in simplified form if need be and forms a reference line on the display panel. In reality, the reference value is "only" approximately a straight line and may deviate from an actual straight line. In the simplest case, the reference element is determined by virtue of only the first form of energy being used at a first operating point and only the second form of energy being used at a second operating point. Alternative measurement methods are conceivable. The consumption display element has a position on the display panel that is described by coordinates. The coordinates of the consumption display element are adjusted on the display panel on the basis of the consumption signals. Therefore, the consumption display element is moved or positioned on the display panel on the basis of the two consumption signals. In this case, its relative position in relation to the at least one reference element provides an indication of the extent to which the actual consumption of the motor vehicle in relation to the two forms of energy (presented separately from one another) differs from the envisaged standard consumption. As an additional option, a background panel on the display panel is provided with a color profile that signals whether the position of the consumption display element represents a consumption that is greater or smaller than the standard consumption. By way of example, there may be provision for a color profile from green (consumption close to the reference consumption) to red or pale green (additional consumption in comparison with the reference).

Disclosed embodiments can have provision for only a single reference element, that is to say the reference line described, for example, to be presented or provided. However, there may also be provision for at least two reference elements to be provided, one of the reference elements indicating a standard driving consumption relating to a standard driving mode of the motor vehicle and the other reference element having an offset therefrom. The offset described indicates a consumption of predetermined vehicle components that are unnecessary for the drive during propulsion driving of the motor vehicle. These vehicle components are predetermined conveniences loads. The vehicle components can comprise, by way of example: an air conditioning system (heating and cooling), an infotainment system and/or a radio module. The relative position of the consumption display element therefore signals the extent to which the actual consumption deviates from an ideal consumption or standard consumption with regard to propulsion driving (standard driving mode) (distance from the first reference element) and the extent to which the actual consumption is remote or differs from a normal mode of the motor vehicle, including the operation of vehicle components that are not needed for propulsion driving itself (distance from the second reference element).

In this context, it is necessary to stipulate what consumption of the vehicle components that are not necessary for propulsion driving is typical or can be expected to be able to adjust the offset. In this context, there may be provision for a consumption of these predetermined vehicle components to be taken as a basis under standard conditions or for it to be ascertained how they can be ascertained by the manufacturer of the motor vehicle, for example. Alternatively, there is provision for the consumption of the vehicle components to be ascertained on the basis of a consumption history in the motor vehicle itself. This results in the actual conditions prevailing in the motor vehicle being taken into consideration. The consumption of the vehicle components is ascertained on a user-specific basis in this case, so that the typical consumption with regard to the user is taken as a basis. The use of a consumption indication under standard conditions is available immediately, whereas the formation of a consumption history first needs a few hours of driving mode before a suitable consumption value is available.

The standard driving consumption may be ascertained in accordance with a currently valid and/or prescribed licensing process (e.g., the ECE-R101 standard). This takes into consideration different driving situations, and it is possible to show the origin of deviations from the statements made by the manufacturer. The standard driving consumption may be determined during the licensing process for the vehicle (e.g., in accordance with the ECE-R101 standard or the like), e.g., to cover the commercial vehicle sector too. In commercial vehicles, the reference driving consumption (that is to say the consumption value for ascertaining the reference element) can be individually geared to the scope of duties by other methods. E.g., the reference consumption for a city bus on a route service can be individually geared to the "bus route" currently being operated.

The consumption display element described can be presented as a single measurement point. Optionally, however, there is provision for the consumption display element to have at least two display portions. By way of example, it may be a line or a dash, the two ends of which each represent a display portion that can be positioned on the display unit independently of the respective other display portion. From the two consumption signals, a driving consumption from a propulsion drive unit of the motor vehicle and a total consumption are ascertained. The total consumption also indicates, in addition to the driving consumption, an additional consumption that is caused by at least one predetermined vehicle component that is independent of the propulsion drive unit, for instance, by at least one predetermined conveniences load. The consumption display element positions the first display portion on the display unit on the basis of the driving consumption and the second display portion on the display unit on the basis of the total consumption. Hence, the display unit is used to signal what proportion of the total consumption arises from the driving style of the driver and what difference (distance between the two display portions) arises on account of the operation of the at least one vehicle component that contributes nothing to propulsion driving.

There may also be provision for more than one consumption display element to be provided. The at least one further consumption display element is likewise positioned on the display unit. In this case, the control of the consumption display elements is based on a respective different time base. There may thus be provision for one consumption display element for a short-term consumption and another consumption display element for a long-term consumption and/or a daily consumption. The consumption signals described may, by way of example, indicate a succession or series of measured values or consumption values that each apply to different times. The time base is then distinguished in that a different number of consumption values is taken as a basis for positioning the respective consumption display element. The time base is therefore the measurement time interval. Hence, the different consumption display elements can signal a trend in the consumption.

Optionally, a first visual appearance parameter, for instance, a color and/or a transparency, of the consumption display elements is adjusted on the basis of the underlying time base. Hence, the consumption display elements are distinguished visually, with the time base used being signaled.

Optionally, a second visual appearance parameter, for instance, a shape and/or form, of the consumption display elements is adjusted on the basis of a respectively represented total energy volume. The total energy volume indicates that energy consumed (both forms of energy) that has arisen within the time base as a total consumption of the motor vehicle. The difference in the appearance parameter may be a difference in the size of the consumption display elements, for example.

Optionally, there is provision for the first consumption signal to indicate a removal of the first form of energy from a first storage device of the motor vehicle, for example, a fuel tank, and for the second consumption signal to indicate a removal of the second form of energy from a second storage device of the motor vehicle, for example, a battery. This means that transfer losses are also taken into consideration too. The consumption can additionally or alternatively also be ascertained directly on the vehicle components in each case.

Disclosed embodiments also include the output apparatus for a motor vehicle, which output apparatus has the display unit described and a processor device. The processor device has a program code that is set up to perform an embodiment of the disclosed method when executed by the processor device. The processor device can have, by way of example, a microcontroller or a microprocessor. The program code may be stored in a data memory of the processor device.

Disclosed embodiments also include a motor vehicle having at least two storage devices for storing different forms of energy and having an embodiment of the disclosed output apparatus. One of the storage devices may be a fuel tank, for example, and/or the other of the storage devices may be a battery (electrical storage battery), for example.

There is provision for the disclosed motor vehicle to have a hybrid propulsion drive unit, operable with both forms of energy, for propulsion driving. The propulsion drive unit may be a combination of an internal combustion engine, on the one hand, and an electric machine, on the other, for example.

The disclosed motor vehicle may be configured as a motor car, for example, as an automobile or truck.

Disclosed embodiments can also be applied to other devices that are operated with at least two different operating resources that have nothing to do with the automotive sector, e.g., domestic appliances (e.g., washing machine-->water/electricity/detergent).

The exemplary embodiments are explained below. In the exemplary embodiments, the described components of the embodiments are each individual features that can be considered independently of one another and that each also develop independently of one another and hence can also be regarded as individually or in a combination other than that shown. Furthermore, the embodiments described can also be augmented by further features from those already described.

In the figures, elements having the same function are each provided with the same reference symbols.

FIG. 1 shows a motor vehicle 10, which may be a motor car, for example. The motor vehicle 10 has a hybrid propulsion drive unit 11 that can have an internal combustion engine 12 and an electric machine 13. For the purpose of operating or supplying power to the propulsion drive unit 11, the motor vehicle 10 can have two storage devices 14, 16. The storage device 14 may be a fuel tank for storing or keeping a fuel 16, for example, gasoline or diesel. The fuel 16 is a first form of energy. The storage device 15 may be a battery, for example, a traction battery. The battery 15 can store electric power 17 that can be used for charging by means of a charging device (not depicted), for example, at an electric charging station. The fuel 16 can be used to operate the internal combustion engine 12. The electric power 17 can be used to operate the electric machine 13. However, the electric power 17 can additionally be consumed by further vehicle components 18. A vehicle component 18 may be an air conditioning system or an infotainment system, for example.

In the motor vehicle 10, the extent to which a consumption of the motor vehicle 10 in relation to the fuel 16 (first form of energy) and the electric power 17 (second form of energy) is a deviation from a standard consumption 19 is signaled to a user (not depicted). The standard consumption 19 is ascertained, e.g., according to the ECE-R101 standard.

To this end, an output apparatus 20 is provided in the motor vehicle 10. The output apparatus 20 has a display unit 21 that, by way of example, may be formed by a screen, for example, a TFT screen (TFT: Thin-film transistor), or an OLED display element (OLED—organic light emitting diode). The display unit 21 provides a display panel 22 on which the consumption can be signaled.

To ascertain the consumption, the output apparatus 20 receives a first consumption signal S1 and a second consumption signal S2. The consumption signal S1 can indicate a consumption of the fuel 16, with a total consumption being able to be ascertained from the storage device 14 in a known manner. The second consumption signal S2 indicates the consumption of electric power 17, the consumption being able to be ascertained from the storage device 15 and/or from individual electrical loads, for example, in a manner known per se.

Figure 2:
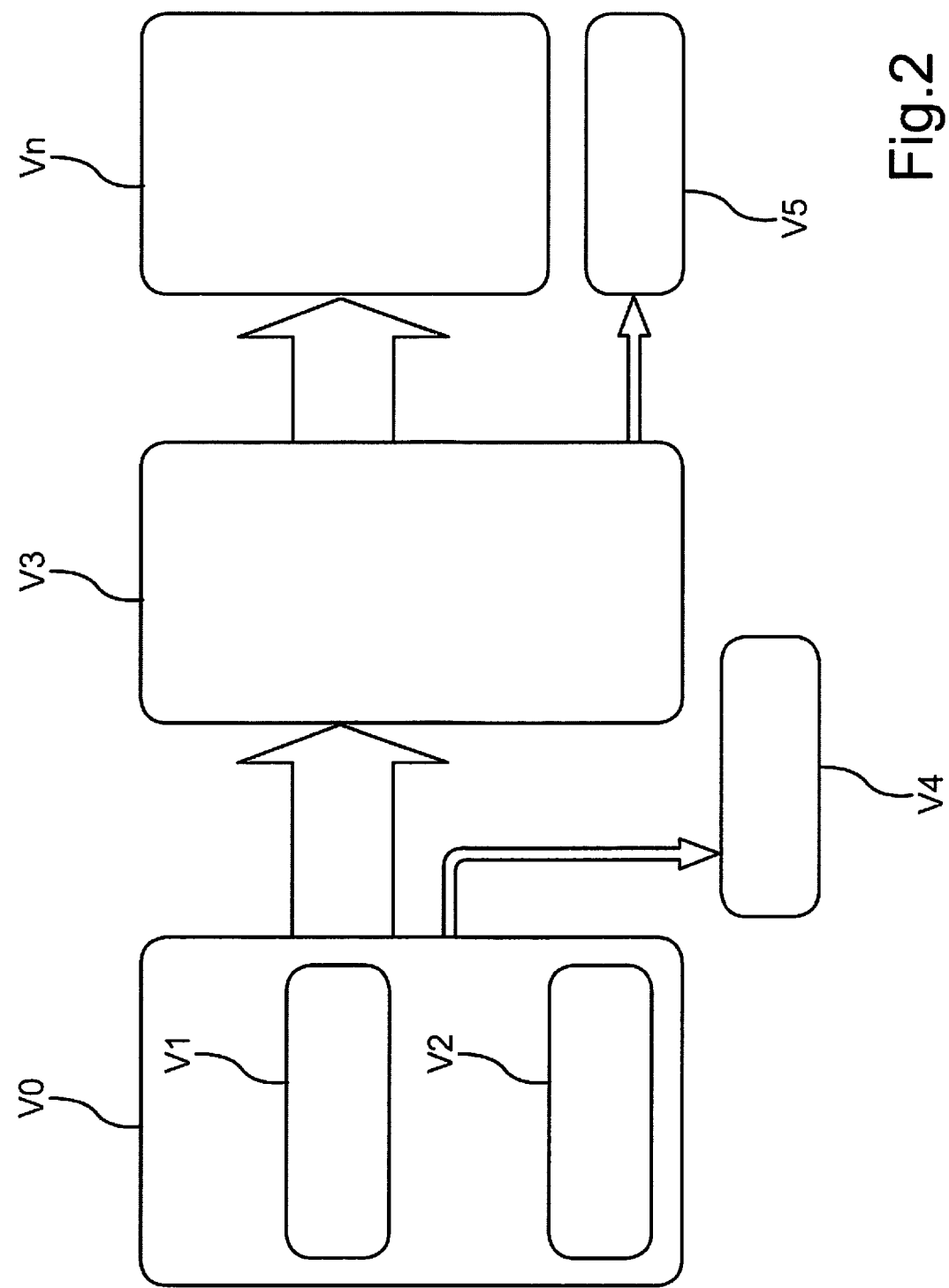
FIG. 2 shows a diagram to illustrate a difference between a standard driving consumption and an actual consumption during a driving mode.

FIG. 2: in the motor vehicle 10, a total energy turnover ("total consumption") V0 is obtained that comprises a fuel consumption V1 (from the fuel tank 14 and, for example, measured in 1/100 km) and the electrical energy turnover ("electrical consumption") V2 (from the battery 15 and, for example, measured in kWh/100 km). The total energy turnover V0 is made up of the energy turnover for the drive system ("driving consumption") V3 and the energy turnover for conveniences loads V4. In this case, the propulsion driving consumption V3 comprises the standard consumption Vn, as can be ascertained on the basis of the ECE-R101 standard, for example, and consumption V5 caused by the driving style or route profile (e.g., incline/descent) that goes beyond or falls below the standard consumption Vn. This additional driving consumption V5 is due to the driving profile of the driver and/or ambient conditions (e.g., incline/descent, headwind).

The text below explains how the output apparatus 20 can be used to depict the deviations from Vn (that is to say V0>V3>Vn) transparently.

Figure 3:
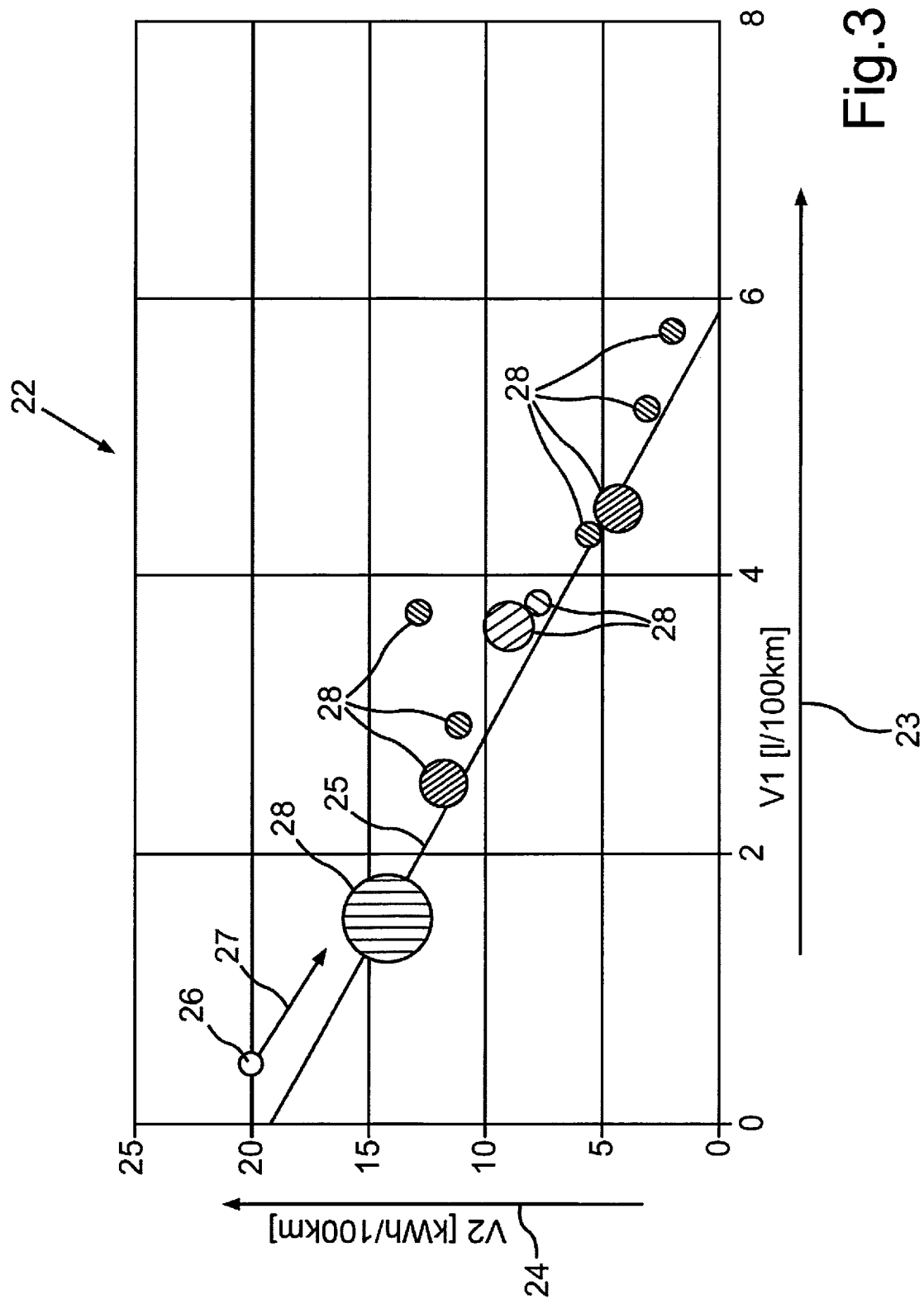
FIG. 3 shows a schematic depiction of a consumption display as obtained according to a first embodiment of the disclosed method.

FIG. 3 illustrates how the output apparatus 20 can take the consumption signals S1, S2 as a basis for displaying on the display panel 22 the fuel consumption V1 along a first direction of extent 23 and the electrical consumption V2 along a second direction of extent 24. The standard consumption is depicted as a reference line 25, which depicts a reference element.

This results in an electrical consumption being plotted over a volumetric consumption. It can be seen that the two values are in an almost linear or, in a simplified depiction, linear relationship. The end of the reference line 25 firstly forms the electrical consumption in a purely electrical mode and secondly forms the fuel consumption in the autonomous mode (e.g., when the battery is discharged) without charging the vehicle. A reference consumption (e.g., according to ECE-R101) in mixed (hybrid) mode then lies on the connecting reference line 25, which corresponds to the reference line 25 in a simplified depiction. A color profile in the background can be used to identify areas within the consumption graph that correspond to environmentally friendly driving. The two consumption signals S1, S2 are used to position a consumption display element 26 on the display panel 22. The closer this measurement point to or extends to the reference line 25, the better the resemblance to the standard consumption. In the course of a journey or measurement recording, the consumption display element 26 migrates through the graph over the display panel 22 when the ratio of fuel consumption V1 to electrical consumption V2 alters, since the battery 15 is discharged. This movement is illustrated by an arrow 27 in FIG. 3. There may be provision for additional or further measurement points or consumption display elements 28 to signal further different time bases, for example, a short-term consumption and/or a long-term consumption or consumption since the last refueling, in addition to the consumption display element 26 with a prescribed reference path or time base for ascertaining an average consumption. The size of the measurement points can provide information about the energy turnover. The presentation of the history, i.e., of the measurement points with a predetermined time base, can be illustrated, by way of example, by adjusting a transparency value, for example, an alpha value, or by graying out, so that older measurements fade or are gradually hidden on the display panel 22.

Figure 4:
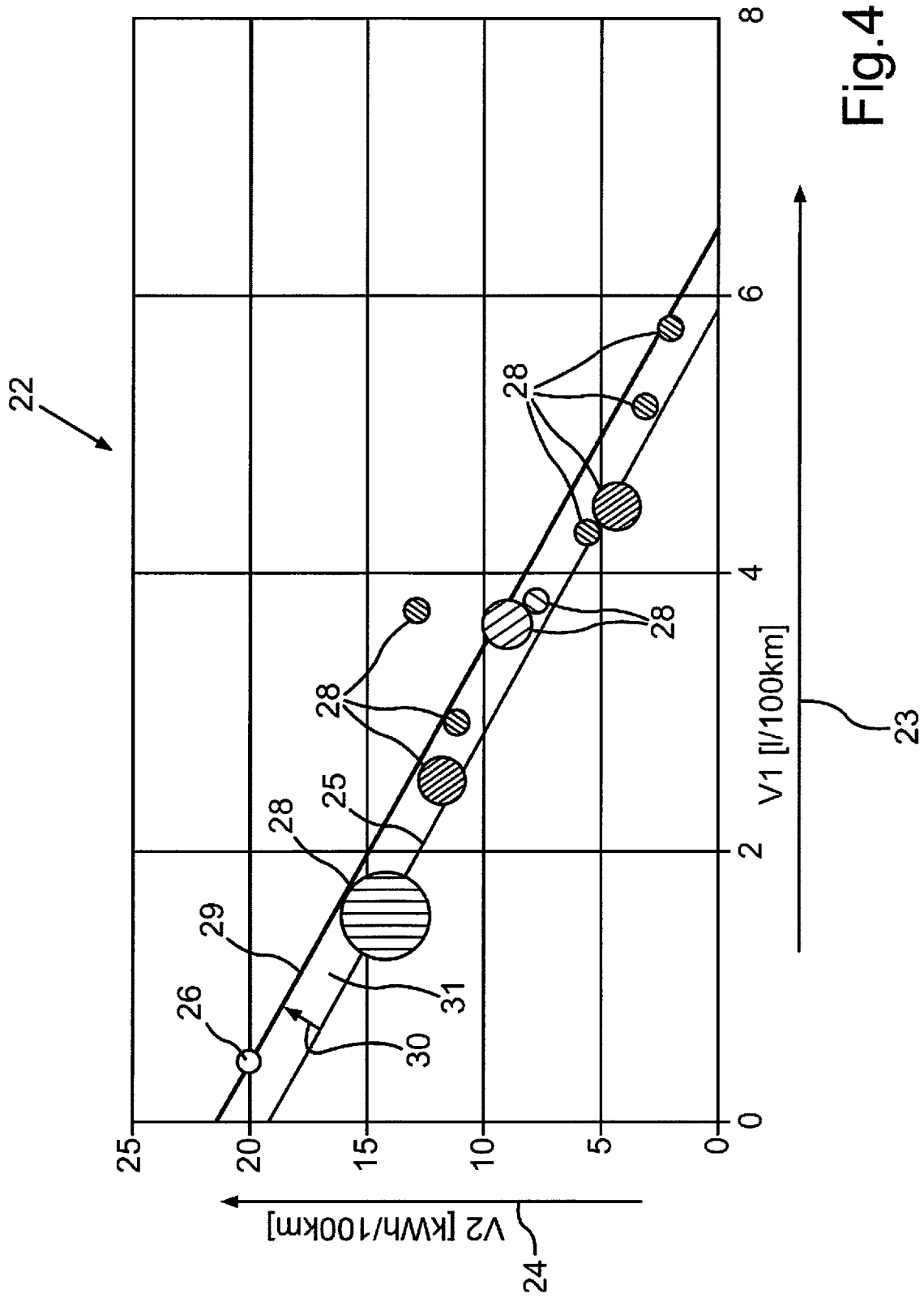
FIG. 4 shows a schematic depiction of a consumption display as obtained by a second embodiment of the disclosed method.

FIG. 4 illustrates how, in addition to the standard consumption signaled by the reference line 25, a second reference element 29 with an offset 30 from the reference element or the reference line 25 can signal a breakdown into driving consumption V3 and total consumption V0 to distinguish the offset of the conveniences loads 28.

One way of ascertaining the offset 30 is to provide standard conditions for the operation of the vehicle components 18 on a test bench. It is also possible for ascertainment to take place at the running time from a user profile. As a result of the depiction of two reference elements with the offset 30, secondary loads are also included in the graph and shown by a consumption band 31. The width of the consumption band 31 describes the conveniences consumption V4. There may be provision for the display device 21 to be touch sensitive and for a further depiction for the breakdown of the load to be able to be activated by touching one of the consumption display elements 26, 28.

Figure 5:
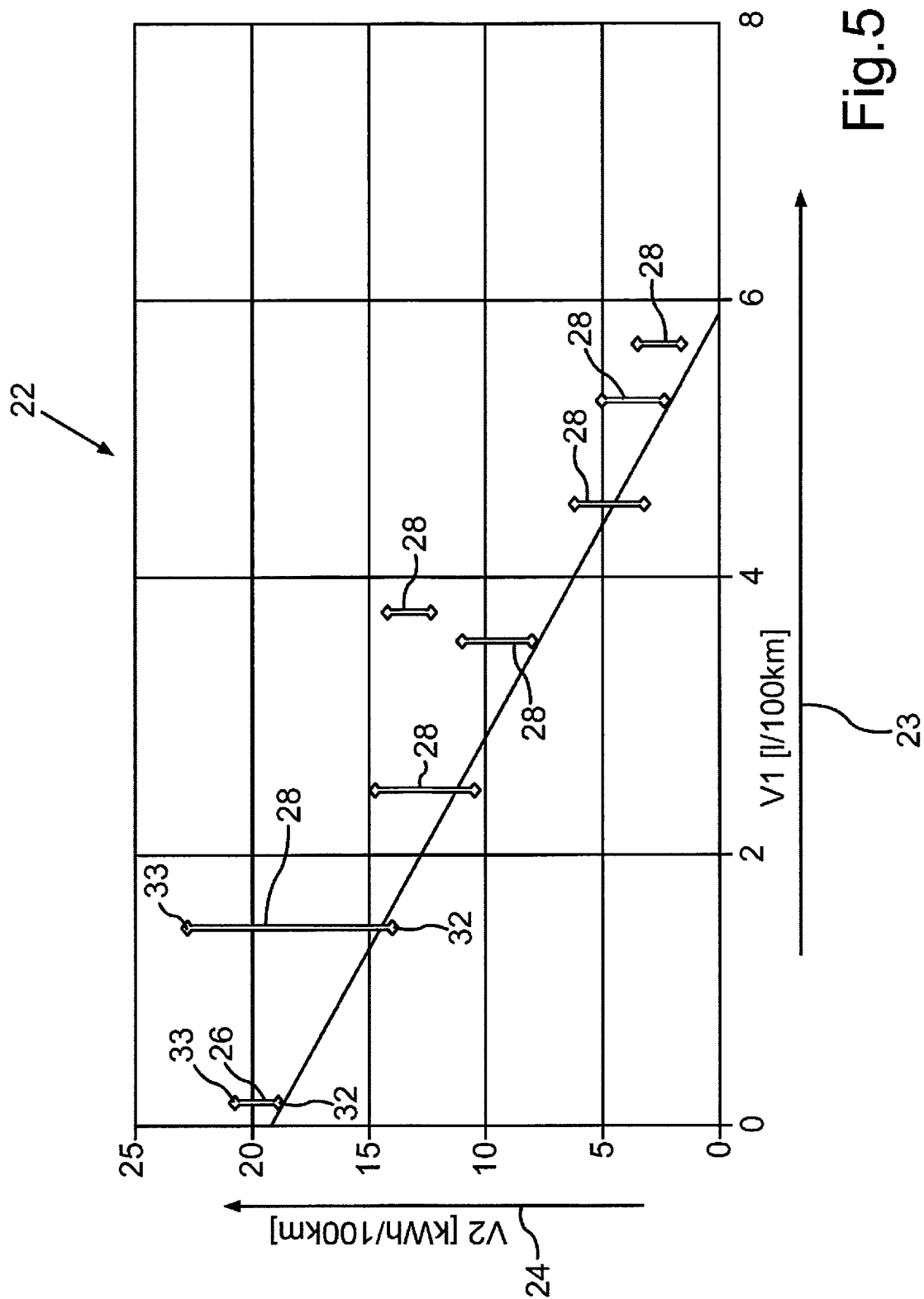
FIG. 5 shows a schematic depiction of a consumption display as obtained according to a third embodiment of the disclosed method.

FIG. 5 illustrates how each consumption display element 26, 28 may be in a two-portion configuration and can have a first display portion 32 and a second display portion 33. The first display portion 32 indicates the driving consumption V3, while the second display portion 33 signals the total consumption (driving consumption plus conveniences consumption) V0. A pair of measured values is therefore obtained for each consumption display element 26, 28, namely a measured value with compensation for the conveniences loads 18 (driving consumption V3) and a measured value for the total consumption. In this case the proportion of the conveniences loads can be shown individually for each measurement point. FIG. 4, on the other hand, provides a simplified depiction.

Figure 6:
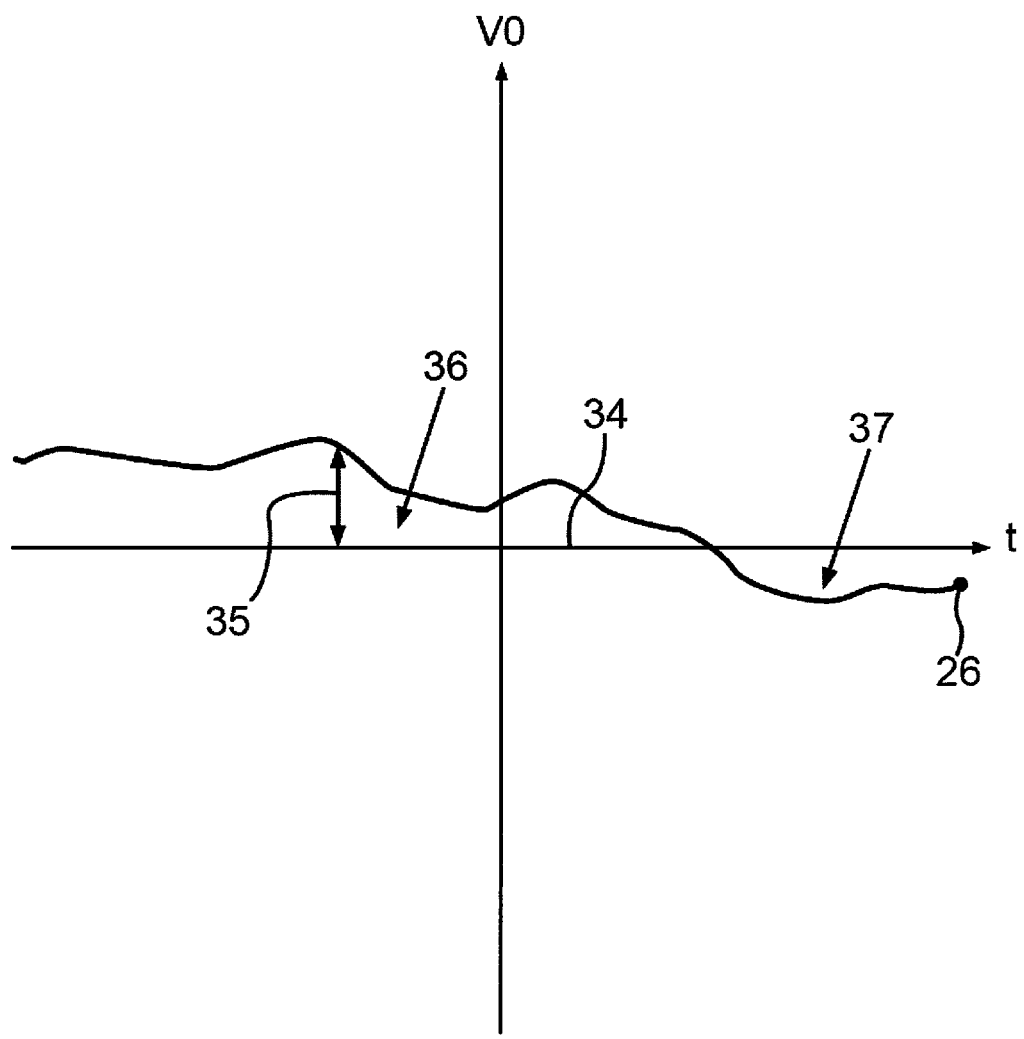
FIG. 6 shows a schematic depiction of a consumption display as obtained according to a fourth embodiment of the disclosed method.

FIG. 6 illustrates how the reference element 34 that can be provided is a time axis that represents the ideal line or the standard consumption over time t. A difference 35 from the standard consumption at different times then yields a position for the consumption display element 26, with the consumption signals S1, S2 being combined in this case to depict the total consumption V0. In the example shown, an additional consumption 36 and, at a later time, a lower consumption 37 are obtained.

Figure 7:
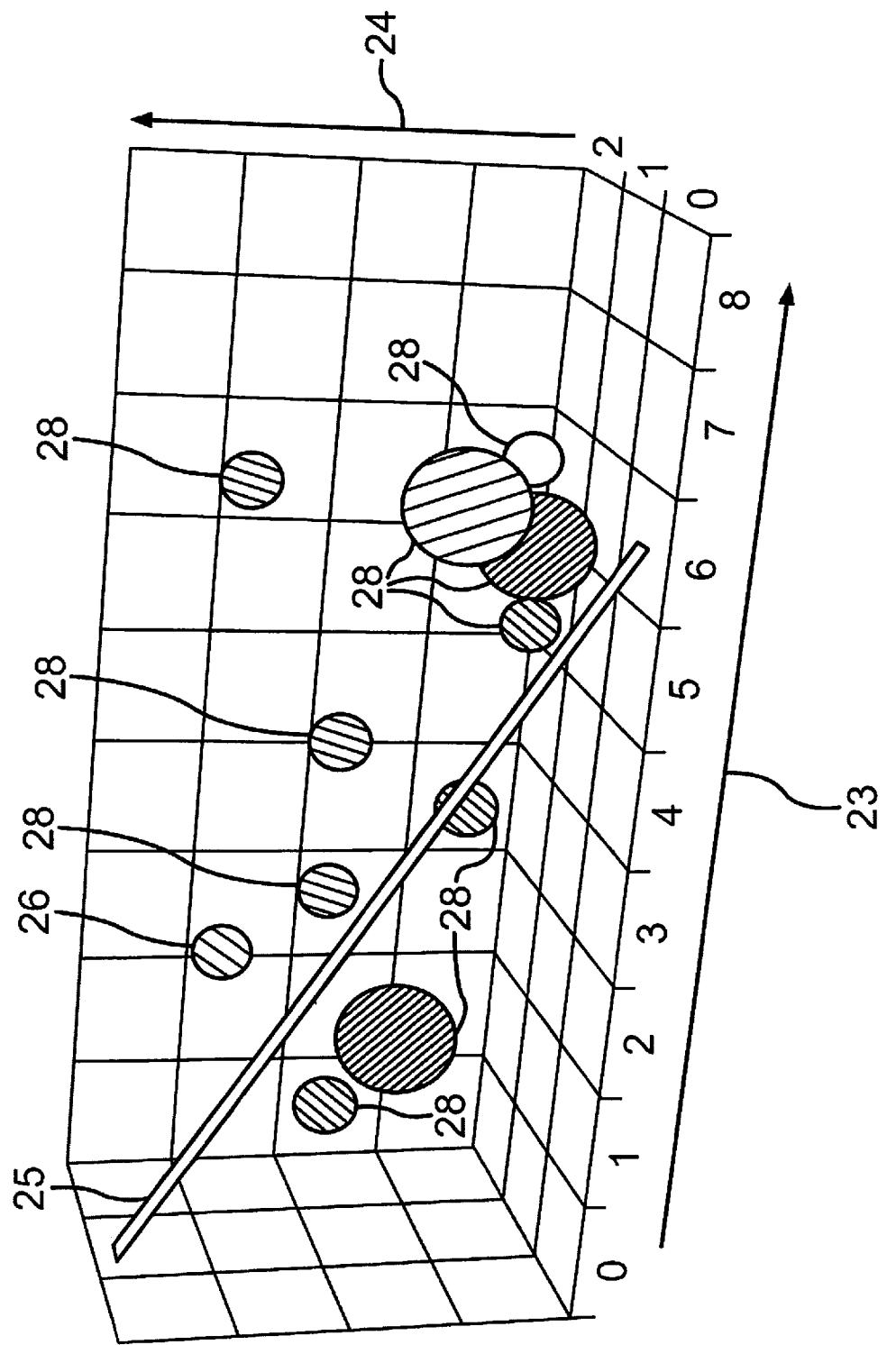
FIG. 7 shows a schematic depiction of a consumption display as obtained according to a fifth embodiment of the disclosed method.
Figure 8:
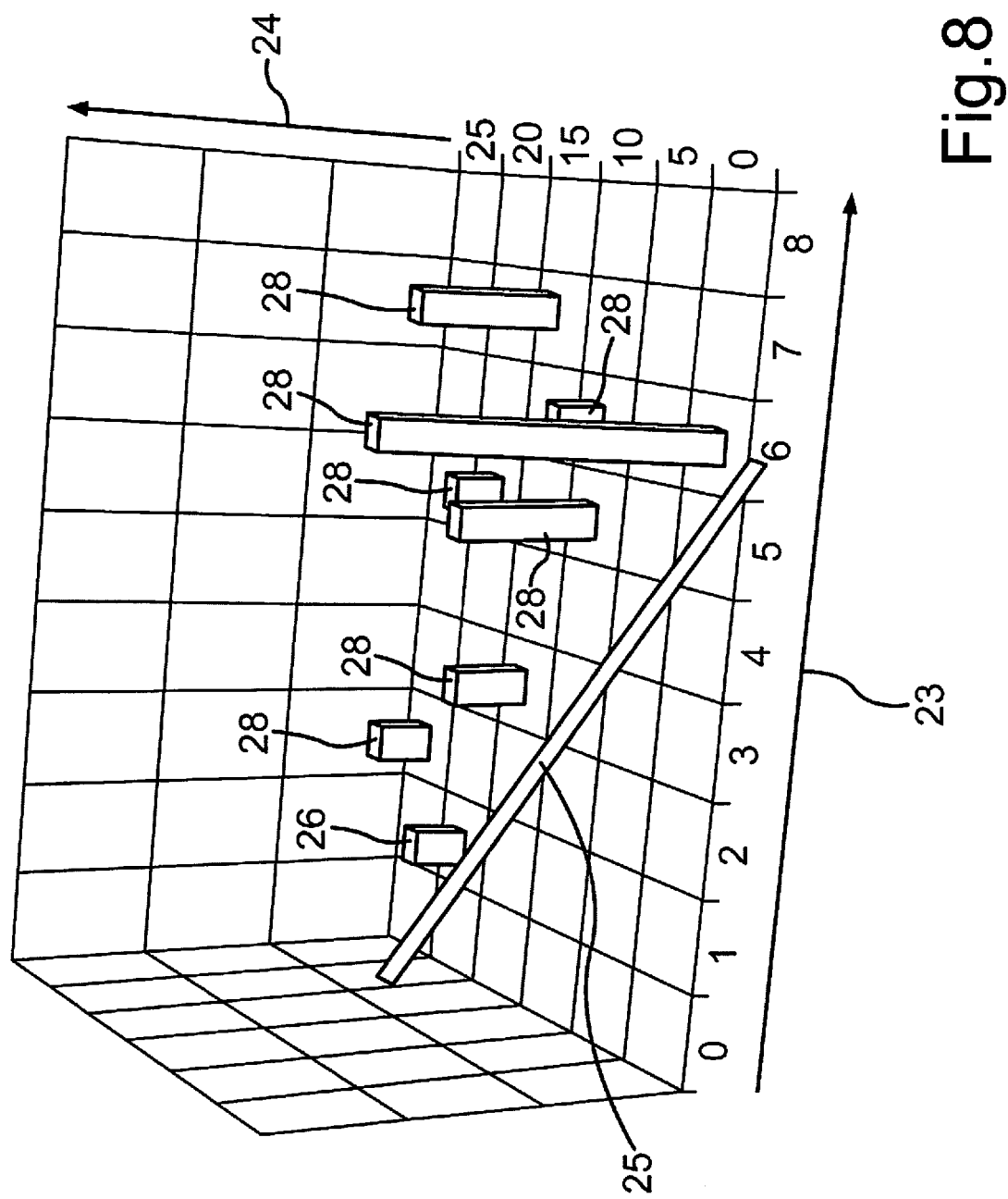
FIG. 8 shows a schematic depiction of a consumption display as obtained according to a sixth embodiment of the disclosed method.

FIG. 7 and FIG. 8 illustrate further possible design forms to obtain a 3D view. Three-dimensional depictions of the graphs are obtained, the directions of extent 23, 24 for the consumption scales being indicated in FIG. 7 and FIG. 8. The dimension remaining in each case can be used, by way of example, for illustrating a time base or an underlying energy volume or for illustrating a secondary consumption that has been consumed in addition to the actual propulsion driving.

This depiction is possible with two drive energy stores in any type of vehicles (e.g., plug-in hybrid with internal combustion engine, plug-in fuel cell vehicle or possibly even CNG vehicles (CNG—compressed natural gas), which can be refueled either with gasoline or with CNG. Although the energy source (battery, hydrogen, gasoline, diesel, natural gas) and hence also the unit and the "numerical value" of the standard consumption changes in the case of these vehicles, everything can be depicted clearly again in this depiction.

For the user, his own driving style becomes clear and the standard consumptions can be "achieved" and deviations therefrom rendered comprehensible. Depending on the evaluation of the "eco tips" or the driving style analysis of the driver, the additional consumption on account of the driving style can be indicated in addition.

Overall, the example shows how the disclosed embodiments can provide a depiction of the vehicle consumption in the driver information system for plug-in hybrid vehicles on the basis of a graph.

LIST OF REFERENCE SYMBOLS

10 Motor vehicle
11 Hybrid propulsion drive device
12 Internal combustion engine
13 Electric machine
14 Storage device
15 Storage device
16 Fuel
17 Energy
18 Vehicle components
19 Standard consumption
20 Output apparatus
21 Display device
22 Display panel
23 Direction of extent
24 Direction of extent
25 Reference line
26 Consumption display element
27 Arrow
28 Consumption display element
29 Reference element
30 Offset
31 Consumption band
32 First display portion
33 Second display portion
34 Reference element
35 Difference
36 Additional consumption
37 Consumption
S1 Consumption signal
S2 Consumption signal
V0 Total consumption
V1 Fuel consumption
V2 Electrical consumption
V3 Driving consumption
V4 Conveniences consumption

The invention claimed is:

1. A method for operating a transportation vehicle output apparatus, the method comprising:
receiving a first energy consumption signal that indicates energy consumption of the transportation vehicle relating to a first form of energy measured in a first unit of measurement;
receiving a second energy consumption signal that indicates energy consumption of the transportation vehicle relating to a second form of energy measured in a second unit of measurement;
generating and displaying at least one energy consumption reference element that indicates a predetermined reference energy consumption relating to a standard driving mode of the transportation vehicle that has been ascertained in accordance with a prescribed energy consumption licensing standard for the transportation vehicle, wherein the at least one energy consumption reference element is a line plotted relative to a time axis displayed on the display unit; and
controlling a position of an energy consumption display element on the time axis displayed on the display unit relative to the displayed at least one energy consumption reference element based on the first and second consumption signals such that relative position of the at least one reference element provides an indication of an extent to which actual energy consumption of the transportation vehicle in relation to the two forms of energy differs from the predetermined reference energy consumption relating to the standard driving mode of the transportation vehicle ascertained in accordance with a prescribed energy consumption licensing standard for the transportation vehicle,
wherein the at least one energy consumption reference element is included in two energy consumption reference elements provided, and one of the two reference elements indicating a reference energy driving consumption relating to the standard driving mode of the transportation vehicle and the other energy consumption reference element having an offset therefrom, wherein the offset indicates an energy consumption of at least one predetermined vehicle component that is producing at least one predetermined conveniences load that is unnecessary and/or independent with regard to propulsion driving of the transportation vehicle.

2. The method of claim 1, further comprising:
converting at least one of the first or second energy consumption signals so that both the first and second consumption signals indicate energy consumption in the same unit of measurement; and
combining the first and second energy consumption signals to form a total energy consumption signal, and
wherein the energy consumption display element is moved along a direction of extent of the time axis over time such that a respective distance of the energy consumption display element from the time axis indicates a difference between the total energy consumption signal and the reference energy consumption of the transportation vehicle indicated by the at least one energy consumption reference element.

3. The method of claim 2, wherein, in addition to the energy consumption display element, at least one further energy consumption display element is provided and is positioned on the energy consumption display unit based on the first and second energy consumption signals, wherein the control of the energy consumption display elements is based on a different time basis.

4. The method of claim 3, wherein a first visual appearance parameter, including at least one of color and transparency, of the energy consumption display element is adjusted based on the underlying time basis.

5. The method of claim 3, wherein a second visual appearance parameter, including shape, of the energy consumption display elements is adjusted based on a represented total energy volume.

6. The method of claim 1, further comprising:
scaling a first direction of extent of a display panel of the display unit by a consumption scale for the first form of energy;
scaling a second direction of extent of the display panel of the display unit by a consumption scale for the second form of energy; and
adjusting coordinates of the consumption display element on the display panel based on the first and second energy consumption signals.

7. The method of claim 1, wherein the energy consumption of the at least one predetermined vehicle component is optionally based on an energy consumption history of the vehicle.

8. The method of claim 7, wherein the energy consumption history in the transportation vehicle is recorded on a user-specific basis.

9. The method of claim 7, wherein an energy consumption of a propulsion drive unit of the transportation vehicle and a total energy consumption of the transportation vehicle are displayed on the energy consumption display unit, in addition to the predetermined reference energy consumption, wherein the consumption display element has at least two display portions including a first and a second display portion, and the first display portion is positioned on the energy consumption display unit based on the energy consumption of the propulsion drive unit and the second display portion is positioned on the energy consumption display unit based on the total energy consumption.

10. The method of claim 1, wherein the predetermined reference energy driving consumption is determined during a licensing process for the transportation vehicle or geared to a scope of duties of the transportation vehicle.

11. The method of claim 1, wherein the first energy consumption signal indicates a removal of the first form of energy from a first storage device of the transportation vehicle and the second energy consumption signal indicates a removal of the second form of energy from a second storage device of the transportation vehicle.

12. The method of claim 1, wherein the first form of energy is a fuel and the second form of energy is electric power.

13. An output apparatus for a transportation vehicle, the output apparatus comprising:
a display unit; and
a processor device,
wherein the processor device has program code that is set up to perform a method when executed by the processor device, the method comprising:
receiving a first energy consumption signal that indicates energy consumption of the transportation vehicle relating to a first form of energy measured in a first unit of measurement;
receiving a second energy consumption signal that indicates energy consumption of the transportation vehicle relating to a second form of energy measured in a second unit of measurement;
generating and displaying at least one energy consumption reference element that indicates a predetermined reference energy consumption relating to a standard driving mode of the transportation vehicle that has been ascertained in accordance with a prescribed energy consumption licensing standard for the transportation vehicle, wherein the at least one energy consumption reference element is a line plotted relative to a time axis displayed on the display unit; and
controlling a position of an energy consumption display element on the time axis displayed on the display unit relative to the displayed at least one energy consumption reference element based on the first and second consumption signals such that relative position of the at least one reference element provides an indication of an extent to which actual energy consumption of the transportation vehicle in relation to the two forms of energy differs from the predetermined reference energy consumption relating to the standard driving mode of the transportation vehicle ascertained in accordance with a prescribed energy consumption licensing standard for the transportation vehicle,
wherein the at least one energy consumption reference element is included in two energy consumption reference elements provided, and one of the two reference elements indicating a reference energy driving consumption relating to the standard driving mode of the transportation vehicle and the other energy consumption reference element having an offset therefrom, wherein the offset indicates an energy consumption of at least one predetermined vehicle component that is producing at least one predetermined conveniences load that is unnecessary and/or independent with regard to propulsion driving of the transportation vehicle.

14. The apparatus of claim 13, further comprising:
converting at least one of the first or second energy consumption signals so that both the first and second consumption signals indicate energy consumption in the same unit of measurement; and
combining the first and second energy consumption signals to form a total energy consumption signal, and
wherein the energy consumption display element is moved along a direction of extent of the time axis over time such that a respective distance of the energy consumption display element from the time axis indicates a difference between the total energy consumption signal and the reference energy consumption of the transportation vehicle indicated by the at least one energy consumption reference element.

15. The apparatus of claim 14, wherein, in addition to an energy consumption display element, at least one further energy consumption display element is provided and is positioned on the energy consumption display unit based on the first and second energy consumption signals, wherein the control of the energy consumption display elements is based on a different time basis.

16. The apparatus of claim 15, wherein a first visual appearance parameter, including at least one of color and transparency, of the energy consumption display element is adjusted based on the underlying time basis.

17. The apparatus of claim 15, wherein a second visual appearance parameter, including shape, of the energy consumption display elements is adjusted based on a represented total energy volume.

18. The apparatus of claim 13, further comprising:
scaling a first direction of extent of a display panel of the display unit by a consumption scale for the first form of energy;
scaling a second direction of extent of the display panel of the display unit by a consumption scale for the second form of energy; and
adjusting coordinates of the consumption display element on the display panel based on the first and second energy consumption signals.

19. The apparatus of claim 13, wherein the energy consumption of the at least one predetermined vehicle component is optionally based on an energy consumption history of the vehicle.

20. The apparatus of claim 13, wherein the energy consumption history in the transportation vehicle is recorded on a user-specific basis.

21. The apparatus of claim 13, wherein the predetermined reference energy driving consumption is determined during a licensing process for the transportation vehicle or geared to a scope of duties of the transportation vehicle.

22. The apparatus of claim 13, wherein an energy consumption of a propulsion drive unit of the transportation vehicle and a total energy consumption of the transportation vehicle are displayed on the energy consumption display unit, in addition to the predetermined reference energy consumption, wherein the consumption display element has at least two display portions including a first and a second display portion, and the first display portion is positioned on the energy consumption display unit based on the energy consumption of the propulsion drive unit and the second display portion is positioned on the energy consumption display unit based on the total energy consumption.

23. The apparatus of claim 13, wherein the first energy consumption signal indicates a removal of the first form of energy from a first storage device of the transportation vehicle and the second energy consumption signal indicates a removal of the second form of energy from a second storage device of the transportation vehicle.

24. The apparatus of claim 13, wherein the first form of energy is a fuel and the second form of energy is electric power.

25. A transportation vehicle having two storage devices for storing different forms of energy and having an output apparatus comprising:
a display unit; and
a processor device, wherein the processor device has program code that is set up to perform a method when executed by the processor device, the method comprising:
receiving a first energy consumption signal that indicates energy consumption of the transportation vehicle relating to a first form of energy measured in a first unit of measurement;
receiving a second energy consumption signal that indicates energy consumption of the transportation vehicle relating to a second form of energy measured in a second unit of measurement;
generating and displaying at least one energy consumption reference element that indicates a predetermined reference energy consumption relating to a standard driving mode of the transportation vehicle that has been ascertained in accordance with a prescribed energy consumption licensing standard for the transportation vehicle, wherein the at least one energy consumption reference element is a line plotted relative to a time axis displayed on the display unit; and
controlling a position of an energy consumption display element on the time axis displayed on the display unit relative to the displayed at least one energy consumption reference element based on the first and second consumption signals such that relative position of the at least one reference element provides an indication of an extent to which actual energy consumption of the transportation vehicle in relation to the two forms of energy differs from the predetermined reference energy consumption relating to the standard driving mode of the transportation vehicle ascertained in accordance with a prescribed energy consumption licensing standard for the transportation vehicle,
wherein the at least one energy consumption reference element is included in two energy consumption reference elements provided, and one of the two reference elements indicating a reference energy driving consumption relating to the standard driving mode of the transportation vehicle and the other energy consumption reference element having an offset therefrom, wherein the offset indicates an energy consumption of at least one predetermined vehicle component that is producing at least one predetermined conveniences load that is unnecessary and/or independent with regard to propulsion driving of the transportation vehicle.

26. The transportation vehicle of claim 25, further comprising a hybrid propulsion drive unit operable with both forms of energy is provided for propulsion driving.

27. The transportation vehicle of claim 25, further comprising:
converting at least one of the first or second energy consumption signals so that both the first and second consumption signals indicate energy consumption in the same unit of measurement; and
combining the first and second energy consumption signals to form a total energy consumption signal, and
wherein the energy consumption display element is moved along a direction of extent of the time axis over time such that a respective distance of the energy consumption display element from the time axis indicates a difference between the total energy consumption signal and the reference energy consumption of the transportation vehicle indicated by the at least one energy consumption reference element.

28. The transportation vehicle of claim 27, wherein, in addition to an energy consumption display element, at least one further energy consumption display element is provided and is positioned on the energy consumption display unit based on the first and second energy consumption signals, wherein the control of the energy consumption display elements is based on a different time basis.

29. The transportation vehicle of claim 28, wherein a first visual appearance parameter, including at least one of color and transparency, of the energy consumption display element is adjusted based on the underlying time basis.

30. The transportation vehicle of claim 28, wherein a second visual appearance parameter, including shape, of the energy consumption display elements is adjusted based on a represented total energy volume.

31. The transportation vehicle of claim 25, further comprising:
- scaling a first direction of extent of a display panel of the display unit by a consumption scale for the first form of energy;
- scaling a second direction of extent of the display panel of the display unit by a consumption scale for the second form of energy; and
- adjusting coordinates of the consumption display element on the display panel based on the first and second energy consumption signals.

32. The transportation vehicle of claim 25, wherein the energy consumption of the at least one predetermined vehicle component is optionally based on an energy consumption history in the vehicle.

33. The transportation vehicle of claim 25, wherein the energy consumption history in the transportation vehicle is recorded on a user-specific basis.

34. The transportation vehicle of claim 25, wherein the predetermined reference energy driving consumption is determined during a licensing process for the transportation vehicle or geared to a scope of duties of the transportation vehicle.

35. The transportation vehicle of claim 25, wherein an energy consumption of a propulsion drive unit of the transportation vehicle and a total energy consumption of the transportation vehicle are displayed on the energy consumption display unit, in addition to the predetermined reference energy consumption, wherein the consumption display element has at least two display portions including a first and a second display portion, and the first display portion is positioned on the energy consumption display unit based on the energy consumption of the propulsion drive unit and the second display portion is positioned on the energy consumption display unit based on the total energy consumption.

36. The transportation vehicle of claim 25, wherein the first energy consumption signal indicates a removal of the first form of energy from a first storage device of the transportation vehicle and the second energy consumption signal indicates a removal of the second form of energy from a second storage device of the transportation vehicle.

37. The transportation vehicle of claim 25, wherein the first form of energy is a fuel and the second form of energy is electric power.

* * * * *